United States Patent
Gabrielson et al.

(10) Patent No.: US 11,148,982 B2
(45) Date of Patent: Oct. 19, 2021

(54) REACTION PRODUCTS AND METHODS FOR MAKING AND USING THE SAME

(71) Applicant: Koch Agronomics Services, LLC, Wichita, KS (US)

(72) Inventors: Kurt D. Gabrielson, Lilburn, GA (US); Mary L. Epling, Conyers, GA (US)

(73) Assignee: Koch Agronomic Services, LLC, Wichita, KS (US)

( * ) Notice: Subject to any disclaimer, the term of this patent is extended or adjusted under 35 U.S.C. 154(b) by 109 days.

(21) Appl. No.: 16/164,198

(22) Filed: Oct. 18, 2018

(65) Prior Publication Data

US 2019/0047918 A1 Feb. 14, 2019

Related U.S. Application Data

(60) Division of application No. 14/929,537, filed on Nov. 2, 2015, now Pat. No. 10,125,056, which is a continuation of application No. 13/098,272, filed on Apr. 29, 2011, now abandoned.

(60) Provisional application No. 61/329,680, filed on Apr. 30, 2010.

(51) Int. Cl.
| | | |
|---|---|---|
| *C05G 3/90* | (2020.01) | |
| *C05C 3/00* | (2006.01) | |
| *C05C 9/00* | (2006.01) | |
| *C05C 9/02* | (2006.01) | |

(52) U.S. Cl.
CPC .................. *C05G 3/90* (2020.02); *C05C 3/00* (2013.01); *C05C 9/00* (2013.01); *C05C 9/02* (2013.01); *Y02P 60/21* (2015.11)

(58) Field of Classification Search
CPC .... C05G 3/90; C05C 3/00; C05C 9/00; C05C 9/02; Y02P 60/218
See application file for complete search history.

(56) References Cited

U.S. PATENT DOCUMENTS

| | | |
|---|---|---|
| 2,593,911 A | 4/1952 | Neumann |
| 3,015,649 A | 1/1962 | Zorn |
| 3,639,646 A | 2/1972 | Borchert |
| 3,874,990 A | 4/1975 | Surdyk |
| 3,954,436 A | 5/1976 | Vad |
| 4,000,184 A | 12/1976 | Kerbeck |
| 4,176,105 A | 11/1979 | Miedaner |
| 4,283,219 A | 8/1981 | Wagner |
| 4,383,077 A | 5/1983 | Bankert |
| 4,409,015 A | 10/1983 | Grace, Jr. |
| 4,551,166 A | 11/1985 | Behnke |
| 5,362,842 A | 11/1994 | Graves |
| 5,389,716 A | 2/1995 | Graves |
| 6,576,035 B2 | 6/2003 | Hartmann |
| 6,632,262 B2 | 10/2003 | Gabrielson |
| 7,513,928 B2 | 4/2009 | Phillips |
| 2003/0157247 A1 | 8/2003 | Chikami |
| 2006/0196241 A1 | 9/2006 | Phillips |
| 2011/0296886 A1 | 12/2011 | Gabrielson |

FOREIGN PATENT DOCUMENTS

| | | |
|---|---|---|
| CN | 1736958 A | 2/2006 |
| CN | 101817712 B | 6/2013 |
| JP | 53069163 A | 6/1978 |
| WO | 2005035448 A1 | 4/2005 |
| WO | 2005/063654 A2 | 7/2005 |
| WO | 2010045712 A1 | 4/2010 |

OTHER PUBLICATIONS

Office Action for India Patent Application No. 3306/KOLNP/2012, 7 pages.
Office Action for Canada Patent Application No. 2798039, 3 pages.
European Search Report mailed in EP Application No. 11775668.4, 8 pages, dated Sep. 29, 2016.
Office Action for Canada Patent Application No. 2798039 dated Jun. 22, 2016.
Office Action for Mexico Patent Application No. Mx/a/2012/012692 dated Jul. 26, 2016.
International Preliminary Report on Patentability received for PCT Application No. PCT/US2011/034669, dated Nov. 6, 2012, 8 pages.
International Search Report and Written Opinion received for PCT Application No. PCT/US2011/034669, dated Jul. 7, 2011, 8 pages.
Examination Report received for Chinese Patent Application No. 201180027859.6, dated Sep. 25, 2014.
Examination Report received for Chinese Patent Application No. 201180027859.6, dated Mar. 24, 2015.
Examination Report received for Australian Patent Application No. 2011245115, dated Mar. 23, 2015.
Examination Report received for Chile Patent Application No. 3049-2012, dated Jan. 17, 2015.
Examination Report received for European Application No. 11775668.4, dated Oct. 11, 2018.
Search report received for BR application No. 112012027904-1, dated Sep. 15, 2020, 7 pages. (3 pages of English translation and 4 pages of official copy).

*Primary Examiner* — Jennifer A Smith

(57) ABSTRACT

Reaction products and methods for making and using the same are provided. In at least one specific embodiment, the fertilizer can include a nitrogen source comprising urea, ammonia, ammonium nitrate, or any combination thereof and a reaction product of formaldehyde, an ammonia source, and a nitrification inhibitor.

20 Claims, No Drawings

REACTION PRODUCTS AND METHODS FOR MAKING AND USING THE SAME

CROSS-REFERENCES TO RELATED APPLICATIONS

This application is a Divisional of U.S. Non-Provisional patent application Ser. No. 14/929,537 filed Nov. 2, 2015, which is a continuation of U.S. patent application Ser. No. 13/098,272, filed on Apr. 29, 2011, which claims priority to U.S. Provisional Patent Application having Ser. No. 61/329,680, filed Apr. 30, 2010, all of which are incorporated by reference herein.

BACKGROUND OF THE INVENTION

Field

Embodiments described herein generally relate to fertilizers. More particularly, such embodiments relate to reaction products that provide an extended period of nitrification inhibition and methods for making and using the same.

Description of the Related Art

Fertilizers typically include urea, ammonia, ammonium nitrate, or a mixture thereof to provide a source of nitrogen. Nitrogen is a vital nutrient for plant growth. When urea is used as a source of nitrogen in the fertilizer, the urea converts to ammonia as a result of hydrolysis catalyzed by urease, which is an enzyme produced by numerous fungi and bacteria found in the soil. Ammonia rapidly undergoes ionization in the soil to form ammonium. In most soils, the resulting ammonium and the ammonium nitrate, if present, are readily oxidized to nitrate ($NO_3^-$) via a sequence of bacterial oxidation reactions, which is commonly referred to as "nitrification." Nitrification of the ammonium, however, happens so fast that a large percentage of the nitrogen in the fertilizer is lost before the plants can utilize it.

Nitrogen is also lost from the soil through volatilization to the atmosphere. Nitrate, another source of nitrogen, is typically lost through leaching into the subsoil by rainwater and/or through denitrification, i.e., bacterial conversion of nitrate to elemental nitrogen.

Attempts to reduce such losses of nitrogen have utilized urease inhibitors and/or nitrification inhibitors as additives to the fertilizer. Urease inhibitors are compounds capable of inhibiting the catalytic activity of the urease enzyme on urea in the soil. Nitrification inhibitors are compounds capable of inhibiting the bacterial oxidation of ammonium to nitrate in the soil. Nitrification inhibitors, however, tend to leach into the soil, away from the plant, thus becoming ineffective at inhibiting nitrification where it is needed-near the plant.

There is a need, therefore, for improved fertilizers that provide an extended period of nitrification inhibition and methods for making and using the same. There is also a need for improved products that reduce nitrification in soil and methods for making and using the same.

SUMMARY OF THE INVENTION

In at least one specific embodiment, the fertilizer can include a nitrogen source comprising urea, ammonia, ammonium nitrate, or any combination thereof and a reaction product of formaldehyde, an ammonia source, and a nitrification inhibitor.

In at least one other specific embodiment, the fertilizer can include a nitrogen source comprising urea, ammonia, ammonium nitrate, or any combination thereof and a reaction product of formaldehyde, urea, an ammonia source, and a nitrification inhibitor.

In at least one specific embodiment, the method for making the fertilizer can include reacting formaldehyde, an ammonia source, and a nitrification inhibitor under conditions sufficient to produce a reaction product. The reaction product can be combined with a nitrogen source to produce the fertilizer. The nitrogen source can include, but is not limited to, urea, ammonia, ammonium nitrate, or any combination thereof.

In at least one specific embodiment, the method for reducing nitrification in soil can include reacting formaldehyde, an ammonia source, and a nitrification inhibitor under conditions sufficient to produce a reaction product. The reaction product can be applied to a soil.

DETAILED DESCRIPTION OF THE INVENTION

The fertilizer can be or include a mixture of one or more nitrogen sources and a reaction product of any three or more of the following: formaldehyde, an ammonia source, a nitrification inhibitor, urea, and a urease inhibitor. For example, the fertilizer can be or include a mixture of one or more nitrogen sources and a reaction product of formaldehyde, an ammonia source, and a nitrification inhibitor. The fertilizer can also be or include a mixture of one or more nitrogen sources and a reaction product of formaldehyde, an ammonia source, a nitrification inhibitor and urea. The fertilizer can also be or include a mixture of one or more nitrogen sources and a reaction product of formaldehyde, an ammonia source, a nitrification inhibitor, urea, and a urease inhibitor. The fertilizer can also be or include a mixture of one or more nitrogen sources and a reaction product of formaldehyde, an ammonia source, a nitrification inhibitor, and a urease inhibitor. The fertilizer can also be or include a mixture of one or more nitrogen sources and a reaction product of formaldehyde, an ammonia source, urea, and a urease inhibitor. The fertilizer can also be or include a mixture of one or more nitrogen sources, one or more urease inhibitors, and a reaction product of any three or more of the following: formaldehyde, an ammonia source, a nitrification inhibitor, and urea.

The nitrogen source can include, but is not limited to, urea, ammonium nitrate, anhydrous ammonia, aqueous ammonia, urea-formaldehyde polymers, or any combination thereof. The nitrogen source can be a solid, liquid, gas, or any combination thereof. Illustrative solid nitrogen sources can be in the form of pellets, prills, flakes, granules, and the like. Illustrative liquid nitrogen sources can be aqueous and/or liquid solutions of one or more nitrogen sources. The nitrogen source can be quick release nitrogen, controlled release nitrogen, or a combination thereof. As used herein, the term "quick release nitrogen" refers to free urea, ammonium nitrate, anhydrous ammonia, aqueous ammonia, or any combination thereof. As used herein, the term "controlled release nitrogen" refers to a substituted urea, reacted urea, e.g., urea-formaldehyde polymer, or a combination thereof. The term, "controlled release nitrogen" can also refer to a nitrogen containing material that coverts more slowly than urea in soil to plant available nutrients ammonium and nitrate than a reference quick release nitrogen source. Another suitable nitrogen source can be or include animal waste(s) such as urine and/or manure produced by one or more animals, e.g., cows, sheep, chickens, buffalo, turkeys, goats, pigs, horses, and the like.

As used herein, the term "nitrification inhibitor" refers to any compound(s) that reduces, inhibits, or otherwise slows down the conversion of ammonium ($NH_4^+$) to nitrate in soil when present as compared to the conversion of ammonium ($NH_4^+$) to nitrate in soil when not present. Illustrative nitrification inhibitors can include, but are not limited to, 2-chloro-6-trichloromethyl-pyridine, 5-ethoxy-3-trichloromethyl-1,2,4-thiadiazol, dicyandiamide, 2-amino-4-chloro-6-methyl-pyrimidine, 1,3-benzothiazole-2-thiol, 4-amino-N-1,3-thiazol-2-ylbenzenesulfonamide, thiourea, guanidine, 3,4-dimethylpyrazole phosphate, 2,4-diamino-6-trichloromethyl-5-triazine, polyetherionophores, 4-amino-1,2,4-triazole, 3-mercapto-1,2,4-triazole, potassium azide, carbon bisulfide, sodium trithiocarbonate, ammonium dithiocarbamate, 2,3, dihydro-2,2-dimethyl-7-benzofuranol methyl-carbamate, N-(2,6-dimethylphenyl)-N-(methoxyacetyl)-alanine methyl ester, ammonium thiosulfate, 1-hydroxypyrazole, 2-methylpyrazole-1-carboxamide, derivatives thereof, and any combination thereof. In at least one example, the nitrification inhibitor can be or include dicyandiamide (DCD). For example, 1-hydroxypyrazole can be considered a derivative of 2-methylpyrazole-1-carboxamide and ammonium dithiocarbamate can be considered a derivative of methyl-carbamate.

As used herein, the term "urease inhibitor" refers to any compound(s) that reduces, inhibits, or otherwise slows down the conversion of urea to ammonium ($NH_4^+$) in soil. Illustrative urease inhibitors can include, but are not limited to, N-(n-butyl)thiophosphoric triamide, N-(n-butyl)phosphoric triamide, thiophosphoryl triamide, phenyl phosphorodiamidate, cyclohexyl phosphoric triamide, cyclohexyl thiophosphoric triamide, phosphoric triamide, hydroquinone, p-benzoquinone, hexamidocyclotriphosphazene, thiopyridines, thiopyrimidines, thiopyridine-N-oxides, N,N-dihalo-2-imidazolidinone, N-halo-2-oxazolidinone, derivatives thereof, or any combination thereof. In at least one example, the urease inhibitor can be or include N-(n-butyl)thiophosphoric triamide (NBPT).

The formaldehyde can be used in many forms. For example, paraform (solid, polymerized formaldehyde) and/or formalin solutions (aqueous solutions of formaldehyde, sometimes with methanol, in about 10 wt %, about 20 wt %, about 37 wt %, about 44 wt %, or about 50 wt %, based on the weight of the formalin solution) are commonly used forms. For example, the formaldehyde can be an aqueous solution having a concentration of formaldehyde ranging from about 10 wt % to about 50 wt %, based on a total weight of the aqueous solution. Formaldehyde gas can also be used. Formaldehyde substituted in part or in whole with substituted aldehydes such as acetaldehyde and/or propylaldehyde can be used as the source of formaldehyde. One or more other aldehydes, such as glyoxal can be used in place of or in combination with formaldehyde. Any of these forms of formaldehyde sources can be used alone or in any combination to prepare the reaction product.

The urea can also be used in many forms. For example, the urea can be a solid in the form of prills, flakes, granules, and the like, and/or a solution, such as an aqueous solution. Further, the urea may be combined with another moiety, for example, formaldehyde and/or urea-formaldehyde adducts, often in aqueous solution. As noted above, the nitrogen source can be or include animal waste such as urine and/or manure. As such, at least a portion of the urea, if present, can be in the form of animal waste. Any form of urea or urea in combination with formaldehyde can be used to make a urea-formaldehyde polymer. Both urea prill and combined urea-formaldehyde products can be used. Illustrative ureaformaldehyde products can include, but are not limited to, Urea-Formaldehyde Concentrate ("UFC"). These types of products can be as discussed and described in U.S. Pat. Nos. 5,362,842 and 5,389,716, for example. Any of these urea sources can be used alone or in any combination to prepare the reaction product.

As used herein, the term "ammonia source" refers to ammonia or any ammonium compound(s) that liberate ammonia when reacted with the formaldehyde and the nitrification inhibitor. Illustrative ammonia sources can include, but are not limited to, ammonium salts such as ammonium chloride and ammonium nitrate, aqueous ammonia or ammonium hydroxide, anhydrous ammonia, or combinations thereof. Suitable aqueous ammonium solutions can have an ammonia concentration of about 28 wt %, about 30 wt %, about 32 wt %, or about 35 wt %, for example. Other suitable ammonia sources can include, but are not limited to, primary amines or substituted primary amines such as methyl amine, monomethanol amine, amino propanol, or any combination thereof. Difunctional amines such as ethylene diamine or any combination of organic amines provided that one primary amine group is available to form a triazone ring can be used. Another source of ammonia can be in the form of animal waste such as urine and/or manure. Any of these ammonia sources can be used alone or in any combination to prepare the reaction product. And the ammonia source can be used in any form such a liquid, solid, and/or gas.

Preparation of the Reaction Product Under Acidic Conditions

The reaction product can be produced under acidic reaction conditions. For example, the reaction product can be produced by reacting formaldehyde, the ammonia source, e.g., ammonium chloride, and the nitrification inhibitor, e.g., dicyandiamide, under acidic reaction conditions at a pH of less than 7. For example, the acidic reaction conditions can be at a pH ranging from a low of about 2.5, about 3, about 3.5, about 4, or about 4.5 to a high of about 5.5, about 6, about 6.5, or about 6.9.

The reaction product produced under the acidic reaction conditions can be prepared by combining, mixing, or otherwise contacting the reaction components (formaldehyde, the ammonium source, and the nitrification inhibitor, and optionally urea, the urease inhibitor, or both) to produce a reaction mixture having a pH of about 7 or less. For example, the reaction mixture of formaldehyde, the ammonia source, and the nitrification inhibitor produced under the acidic reaction conditions can have a pH ranging from a low of about 3, about 3.5, about 4, or about 4.5 to a high of about 5.5, about 6, or about 6.5. Similarly, the reaction mixture of formaldehyde, the ammonia source, the nitrification inhibitor, and urea and/or the urease inhibitor produced under the acidic reaction conditions can also have a pH ranging from a low of about 3, about 3.5, about 4, or about 4.5 to a high of about 5.5, about 6, or about 6.5. Heat from the exothermic reaction can be allowed to heat the reaction mixture to a temperature ranging from a low of about 50° C., about 60° C., or about 65° C. to a high of about 75° C., about 80° C., about 90° C., or about 100° C. The reaction mixture can be maintained at an elevated temperature, e.g., from about 50° C. to about 95° C. for a time ranging from about 1 minute to about 2 hours. The resulting reaction mixture can then be cooled to, for example, room temperature, to provide the reaction product.

The reaction components (formaldehyde, ammonia source, nitrification inhibitor, and the optional urea and/or urease inhibitor) can be combined with one another in any order or sequence. For example, the formaldehyde and the nitrification inhibitor can first be combined to form a first mixture and the ammonia source can then be added to the first mixture to produce a second mixture. In another example, the formaldehyde and the ammonia source can be combined to produce a first mixture and then the nitrification inhibitor can be added to the first mixture to produce the second mixture. In still another example, the ammonia source and the nitrification inhibitor can be combined to produce a first mixture and the formaldehyde can be added to the first mixture to produce the second mixture. In yet another example, the formaldehyde, ammonia source, and nitrification inhibitor can be combined together at the same time to produce a mixture. The addition of urea and/or the urease inhibitor, if present, can similarly be combined in any order or sequence to produce the reaction mixture(s). If the reaction components are combined such that more than one mixture is formed, e.g., a first mixture and a second mixture, the first mixture can be at least partially reacted prior to forming the second mixture. Additional details for reacting formaldehyde, an ammonia source, and dicyandiamide under acidic conditions can be similar to those discussed and described in U.S. Pat. Nos. 3,015,649; 3,639,646; and 4,000,184.

Prior to the reaction, during the reaction, and/or after the reaction between the reaction components (formaldehyde, ammonia source, and nitrification inhibitor, and optionally urea and/or the urease inhibitor), one or more acidic compounds can be added to lower the pH of the reaction mixture and/or the reaction product. Illustrative acids can include mineral acids such as hydrochloric acid, sulfuric acid, nitric acid, phosphoric acid, or any combination thereof.

The reaction product produced under the acidic reaction conditions can have a pH less than about 7. For example, the reaction product of formaldehyde, the ammonia source, and the nitrification inhibitor produced under the acidic reaction conditions can have a pH ranging from a low of about 3, about 3.5, about 4, or about 4.5 to a high of about 5.5, about 6, or about 6.5. Similarly, the reaction product of formaldehyde, the ammonia source, the nitrification inhibitor, and urea and/or the urease inhibitor produced under the acidic reaction conditions can also have a pH ranging from a low of about 3, about 3.5, about 4, or about 4.5 to a high of about 5.5, about 6, or about 6.5.

Preparation of the Reaction Product Under Basic Conditions

The reaction product can be produced under basic or alkaline reaction conditions. For example, the reaction product can be produced by reacting formaldehyde, the ammonia source, e.g., ammonium hydroxide, the nitrification inhibitor, e.g., dicyandiamide, and optionally urea and/or the urease inhibitor under basic reaction conditions at a pH of greater than 7. For example, the basic reaction conditions can be at a pH ranging from a low of about 7, about 7.5, about 8, about 8.5, or about 9 to a high of about 9.5, about 10, about 10.5, or about 11.

The reaction product produced under basic reaction conditions can be prepared by combining, mixing, or otherwise contacting the reaction components (formaldehyde, the ammonium source, and the nitrification inhibitor, and optionally urea, the urease inhibitor, or both) to produce a reaction mixture having a pH greater than about 7. For example, the reaction mixture of formaldehyde, the ammonia source, and the nitrification inhibitor under the basic reaction conditions can have a pH ranging from a low of about 8, about 8.5, or about 9 to a high of about 9.5, about 10, about 10.5, or about 11. Similarly, the reaction mixture of formaldehyde, the ammonia source, the nitrification inhibitor, and urea and/or the urease inhibitor under the basic reaction conditions can also have a pH ranging from a low of about 8, about 8.5, or about 9 to a high of about 9.5, about 10, about 10.5, or about 11. Heat from the exothermic reaction can be allowed to heat the reaction mixture to a temperature ranging from a low of about 50° C., about 60° C., or about 65° C. to a high of about 80° C., about 90° C., or about 100° C. The reaction mixture can be maintained at an elevated temperature, e.g., from about 50° C. to about 90° C. for a time ranging from about 1 minute to about 3 hours. The resulting reaction mixture can then be cooled to, for example, room temperature, to provide the reaction product.

The reaction components (formaldehyde, ammonia source, nitrification inhibitor, and optional urea and/or urease inhibitor) can be combined with one another in any order or sequence. For example, formaldehyde and a first portion of the ammonia source can be combined to produce a first mixture. The first mixture can be at least partially reacted. The nitrification inhibitor can then be added to the first mixture or to the at least partially reacted first mixture to produce a second mixture. The second mixture can be at least partially reacted. A second portion of the ammonia source can then be added to the second mixture or to the at least partially reacted second mixture to produce a third mixture. The third mixture can be at least partially reacted to produce the reaction product. The temperature of the first mixture and the second mixture can be maintained at a temperature ranging from about 25° C. to about 70° C. The temperature of the third mixture can range from about 60° C. to about 90° C. and can be held at the increased temperature, e.g., from about 75° C. to about 90° C., for a period of time ranging from about 5 minutes to about 3 hours.

In another example, formaldehyde and a first portion of the ammonia source can be combined to form a first mixture. The first mixture can be at least partially reacted. The nitrification inhibitor can then be added to the first mixture or to the at least partially reacted first mixture to produce a second mixture. The second mixture can be at least partially reacted. Urea can then be added to the second mixture or the at least partially reacted second mixture to produce a third mixture. The third mixture can be at least partially reacted. A second portion of the ammonia source can be added to the third mixture to produce a fourth mixture. The fourth mixture can be at least partially reacted to produce the reaction product of formaldehyde, urea, ammonia, and the nitrification inhibitor. The temperature of the first mixture, second mixture, and third mixture can be maintained at a temperature ranging from about 25° C. to about 70° C. The temperature of the fourth mixture can range from about 60° C. to about 90° C. and can be held at the increased temperature for a period of time ranging from about 5 minutes to about 3 hours.

The addition of the urease inhibitor, if present, can similarly be combined in any order or sequence to produce another reaction mixture or can be combined with the first, second, third, and/or fourth reaction mixture. In another example, the reaction components (formaldehyde, ammonia source, and nitrification inhibitor, and the optional urea and/or urease inhibitor) can be simultaneously combined together to from a single reaction mixture. In yet another example, the formaldehyde and the nitrification inhibitor, and, if present, urea and/or urease inhibitor can be combined to provide a first mixture and the ammonia source can then be added to the first mixture to produce a second mixture. The second mixture can then be reacted to produce the reaction product.

Exothermic heat generated from the first mixture, second mixture, third mixture, fourth mixture, or any number of mixtures, can be used, at least in part, as the heat source for heating any one or more of the reaction mixtures. In another example, heat can be introduced to any one or more of the reaction mixtures to provide a heated reaction mixture via a heating coil or other heat exchanging device or system. The temperature of the reaction mixtures can be maintained below a desired maximum temperature, e.g., 100° C., via a cooling coil or other heat exchanging device or system.

One or more bases or base compounds can be added before and/or during the reaction to any one or more of the reaction mixtures and/or the reaction product to maintain and/or adjust the pH thereof. For example, the reaction product produced under basic reaction conditions can be maintained at a pH of about 8 to about 11 during the reaction and/or for the final reaction product. Illustrative base compounds suitable for adjusting the pH of the reaction product can include, but are not limited to, ammonia, amines, e.g., primary, secondary, and tertiary amines and polyamines, sodium hydroxide (NaOH), potassium hydroxide (KOH), or any combination thereof. An aqueous base solution can have any concentration. For example, an aqueous base solution of sodium hydroxide, potassium hydroxide, or a combination thereof, having a concentration ranging from a low of about 5 wt %, about 10 wt %, or about 15 wt % to a high of about 25 wt %, about 50 wt %, or about 75 wt % can be introduced to one or more of the reaction mixtures and/or the reaction product in order to adjust and/or maintain the pH between about 8 and about 11.

In another example, one or more pH buffering compounds, which can buffer the pH of the reaction mixture(s) at a desired pH, can be added at the start of the reaction. Illustrative pH buffering compounds can include, but are not limited to, triethanolamine, sodium borate, potassium bicarbonate, sodium carbonate, potassium carbonate, or any combination thereof. In another example the one or more pH buffering compounds can be used in conjunction with one or more base compounds to adjust and/or maintain a desired pH of the reaction mixture(s).

The reaction product produced under the basic reaction conditions can have a pH greater than 7. For example, the reaction product of formaldehyde, the ammonia source, and the nitrification inhibitor produced under the basic reaction conditions can have a pH ranging from a low of about 8, about 8.5, or about 9 to a high of about 9.5, about 10, about 10.5, or about 11. Similarly, the reaction product of formaldehyde, the ammonia source, the nitrification inhibitor, and the urea and/or the urease inhibitor produced under the basic reaction conditions can also have a pH ranging from a low of about 8, about 8.5, or about 9 to a high of about 9.5, about 10, about 10.5, or about 11.

Additional details for reacting formaldehyde, urea, and an ammonia source under basic conditions are discussed and described in U.S. Pat. Nos. 6,632,262 and 7,513,928 and U.S. Patent Application Publication No. 2006/0196241.

The reaction product produced via either acidic conditions or basic conditions can include one or more other additives. For example, ethylene diamine can be added to the reaction product and/or to an intermediate mixture formed during the production thereof. Ethylene diamine can help adjust, control, and/or maintain water solubility of the reaction product. Other chelating agents include ethylenediaminetetraacetic acid (EDTA), diethylenetriaminepentaacetic acid (DPTA), N(hydroxyethyl)ethylenediaminetriacetic acid (HEDTA), nitrilotriacetic acid (NT A), along with a wide range of conjugate bases for the previously listed acids. Suitable commercially available suspension additives can include, for example, K-Tionic, which is manufactured and distributed by OBS Biosciences, LLC.

The reaction product from the reaction of formaldehyde, the ammonia source, and the nitrification inhibitor under acidic conditions can include from about 30 mol % to about 70 mol % formaldehyde, from about 5 mol % to about 25 mol % ammonia, and from about 15 mol % to about 45 mol % nitrification inhibitor, based on the total weight of the formaldehyde, ammonia, and nitrification inhibitor. The formaldehyde can be present in an amount ranging from a low of about 35 mol %, about 40 mol %, or about 45 mol % to a high of about 50 mol % about 60 mol %, or about 65 mol %, based on the total weight of the formaldehyde, ammonia, and nitrification inhibitor. The ammonia can be present in an amount ranging from a low of about 7 mol %, about 10 mol %, or about 12 mol % to a high of about 15 mol %, about 18 mol %, or about 20 mol %, based on the total weight of the formaldehyde, ammonia, and nitrification inhibitor. The nitrification inhibitor can be present in an amount ranging from a low of about 20 mol %, about 25 mol %, or about 30 mol % to a high of about 35 mol %, about 40 mol %, or about 43 mol %, based on the total weight of the formaldehyde, ammonia, and nitrification inhibitor.

The reaction product from the reaction of formaldehyde, the ammonia source, and the nitrification inhibitor under basic conditions can include from about 30 mol % to about 80 mol % formaldehyde, from about 10 mol % to about 35 mol % ammonia, and from about 10 mol % to about 35 mol % nitrification inhibitor, based on the total weight of the formaldehyde, ammonia, and nitrification inhibitor. The formaldehyde can be present in an amount ranging from a low of about 33 mol %, about 37 mol %, or about 40 mol % to a high of about 60 mol %, about 70 mol %, or about 75 mol %, based on the total weight of the formaldehyde, ammonia, and nitrification inhibitor. The ammonia can be present in an amount ranging from a low of about 12 mol %, about 15 mol %, or about 20 mol % to a high of about 25 mol %, about 30 mol %, or about 33 mol %, based on the total weight of the formaldehyde, ammonia, and nitrification inhibitor. The nitrification inhibitor can be present in an amount ranging from a low of about 12 mol %, about 15 mol %, or about 20 mol % to a high of about 25 mol %, about 30 mol %, or about 33 mol %, based on the total weight of the formaldehyde, ammonia, and nitrification inhibitor.

The reaction product from the reaction of formaldehyde, urea, the ammonia source, and the nitrification inhibitor under acidic conditions can include from about 30 mol % to about 70 mol % formaldehyde, from about 5 mol % to about 25 mol % urea, from about 5 mol % to about 25 mol % ammonia, and from about 5 mol % to about 45 mol % nitrification inhibitor, based on the total weight of the formaldehyde, urea, ammonia, and nitrification inhibitor. The formaldehyde can be present in an amount ranging from a low of about 35 mol %, about 40 mol %, or about 45 mol % to a high of about 50 mol %, about 60 mol %, or about 65 mol %, based on the total weight of the formaldehyde, urea, ammonia, and nitrification inhibitor. The urea can be present in an amount ranging from a low of about 8 mol %, about 10 mol %, or about 12 mol % to a high of about 18 mol %, about 22 mol %, or about 24 mol %, based on the total weight of the formaldehyde, urea, ammonia, and nitrification inhibitor. The ammonia can be present in an amount ranging from a low of about 7 mol %, about 10 mol %, or about 12 mol % to a high of about 15 mol %, about 18 mol %, or about 20 mol %, based on the total weight of the formaldehyde, urea, ammonia, and nitrification inhibitor. The nitrification inhibitor can be present in an amount ranging from a low of about 10 mol %, about 15 mol %, or about 20 mol % to a high of about 35 mol %, about 40 mol %, or about 45 mol %, based on the total weight of the formaldehyde, urea, ammonia, and nitrification inhibitor.

The reaction product from the reaction of formaldehyde, urea, the ammonia source, and the nitrification inhibitor under basic conditions can include from about 25 mol % to about 65 mol % formaldehyde, from about 10 mol % to about 25 mol % urea, from about 5 mol % to about 25 mol % ammonia, and from about 5 mol % to about 25 mol % nitrification inhibitor, based on the total weight of the formaldehyde, urea, ammonia, and nitrification inhibitor. The formaldehyde can be present in an amount ranging from a low of about 25 mol %, about 30 mol %, or about 35 mol % to a high of about 50 mol %, about 55 mol %, or about 60 mol %, based on the total weight of the formaldehyde, urea, ammonia, and nitrification inhibitor. The urea can be present in an amount ranging from a low of about 12 mol %, about 14 mol %, or about 16 mol % to a high of about 18 mol %, about 22 mol %, or about 25 mol %, based on the total weight of the formaldehyde, urea, ammonia, and nitrification inhibitor. The ammonia can be present in an amount ranging from a low of about 7 mol %, about 9 mol %, or about 12 mol % to a high of about 18 mol %, about 22 mol %, or about 25 mol %, based on the total weight of the formaldehyde, urea, ammonia, and nitrification inhibitor. The nitrification inhibitor can be present in an amount ranging from a low of about 7 mol %, about 9 mol %, or about 12 mol % to a high of about 18 mol %, about 22 mol %, or about 25 mol %, based on the total weight of the formaldehyde, urea, ammonia, and nitrification inhibitor.

The reaction product from the reaction of formaldehyde, the ammonia source, and the nitrification inhibitor under acidic conditions can have a molar ratio of formaldehyde to ammonia ranging from about 1:1 to about 9:1, about 1:1 to about 8:1, about 3:1 to about 9:1, about 4:1 to about 8:1, about 5:1 to about 9:1, or about 6:1 to about 8:1. Similarly, the reaction product of formaldehyde, urea, the ammonia source, and the nitrification inhibitor and/or the reaction product of formaldehyde, the ammonia source, the nitrification inhibitor, and the urease inhibitor under acidic conditions can have a molar ratio of formaldehyde to ammonia ranging from a bout 1:1 to about 9:1, about 1:1 to about 8:1, about 3:1 to about 9:1, about 4:1 to about 8:1, about 5:1 to about 9:1, or about 6:1 to about 8:1.

The reaction product of formaldehyde, the ammonia source, and the nitrification inhibitor under acidic conditions can have a molar ratio of formaldehyde to nitrification inhibitor ranging from about 1:1 to about 4:1, about 1:1 to about 3:1, about 1:1 to about 2:1, about 1.5:1 to about 2.5:1, about 1:1 to about 2.5:1, about 1.7:1 to about 2.3:1, or about 1.8:1 to about 2.2:1. The reaction product of formaldehyde, the ammonia source, the nitrification inhibitor, and the urease inhibitor under acidic conditions can have a molar ratio of formaldehyde to nitrification inhibitor ranging from about 1:1 to about 4:1, about 1:1 to about 2:1, about 1.5:1 to about 2.5:1, about 1:1 to about 2.5:1, about 1.7:1 to about 2.3:1, or about 1.8:1 to about 2.2:1. The molar ratio of formaldehyde to the urease inhibitor in the reaction product of formaldehyde, the ammonia source, the nitrification inhibitor, and the urease inhibitor under acidic conditions can be the same or similar to the molar ratio of formaldehyde to the nitrification inhibitor.

The reaction product of formaldehyde, urea, the ammonia source, and the nitrification inhibitor under acidic conditions can have a molar ratio of formaldehyde to urea ranging from about 1:1 to about 2:1, about 1:1 to about 1.9:1, about 1.1:1 to about 1.8:1, about 1.2:1 to about 1.7:1, or about 1.3:1 to about 2:1. The reaction product of formaldehyde, urea, the ammonia source, the nitrification inhibitor, and the urease inhibitor under acidic conditions can have a molar ratio of formaldehyde to urea ranging from about 1:1 to about 2:1, about 1:1 to about 1.9:1, about 1.1:1 to about 1.8:1, about 1.2:1 to about 1.7:1, or about 1.3:1 to about 2:1.

The reaction product of formaldehyde, the ammonia source, and the nitrification inhibitor under basic conditions can have a molar ratio of formaldehyde to ammonia ranging from about 1:1 to about 8:1, about 2:1 to about 6:1, about 2.5:1 to about 5:1, about 3:1 to about 4:1, or about 2:1 to about 4:1. The reaction product of formaldehyde, urea, the ammonia source, and the nitrification inhibitor under basic conditions can have a molar ratio of formaldehyde to ammonia ranging from about 1:1 to about 8:1, about 2:1 to about 6:1, about 3:1 to about 5:1, or about 3.5:1 to about 4.5:1. The reaction product of formaldehyde, urea, the ammonia source, the nitrification inhibitor, and the urease inhibitor under basic conditions can have a molar ratio of formaldehyde to ammonia ranging from about 1:1 to about 8:1, about 2:1 to about 6:1, about 3:1 to about 5:1, or about 3.5:1 to about 4.5:1.

The reaction product of formaldehyde, the ammonia source, and the nitrification inhibitor under basic conditions can have a molar ratio of formaldehyde to nitrification inhibitor ranging from about 1:1 to about 7:1, about 1.5:1 to about 6.5:1, about 2:1 to about 6:1, about 2.5:1 to about 5:1, about 2:1 to about 4:1, or about 2.5:1 to about 3.5:1. The reaction product of formaldehyde, urea, the ammonia source, and the nitrification inhibitor under basic conditions can have a molar ratio of formaldehyde to nitrification inhibitor ranging from about 1:1 to about 8:1, about 1:1 to about 7:1, about 2:1 to about 8:1, about 3:1 to about 7.5:1, or about 3.5:1 to about 7:1.

The reaction product of formaldehyde, the ammonia source, the nitrification inhibitor, and the urease inhibitor under basic conditions can have a molar ratio of formaldehyde to nitrification inhibitor ranging from about 1:1 to about 7:1, about 1:1 to about 5:1, about 1.5:1 to about 4:1, about 2:1 to about 4:1, about 2.5:1 to about 3.5:1, or about 2.7:1 to about 3.5:1. The molar ratio of formaldehyde to the urease inhibitor in the reaction product of formaldehyde, the ammonia source, the nitrification inhibitor, and the urease inhibitor under basic conditions can be the same or similar to the molar ratio of formaldehyde to the nitrification inhibitor.

The reaction product of formaldehyde, urea, the ammonia source, and the nitrification inhibitor under basic conditions can have a molar ratio of formaldehyde to urea ranging from about 1:1 to about 4:1, about 1.1:1 to about 3.9:1, about 1:1 to about 2:1, about 1:1 to about 1.5:1, or about 1:1 to about 1.3:1. The reaction product of formaldehyde, urea, the ammonia source, the nitrification inhibitor, and the urease inhibitor under basic conditions can have a molar ratio of formaldehyde to urea ranging from 1:1 to about 4:1, about 1.1:1 to about 3.9:1, about 1:1 to about 2:1, about 1:1 to about 1.5:1, or about 1:1 to about 1.3:1.

The reaction product can be produced by reacting formaldehyde, an ammonia source, and a nitrification inhibitor. In another example, the reaction product can be produced by reacting formaldehyde, urea, an ammonia source, and a nitrification inhibitor. In yet another example, the reaction product can be produced by reacting formaldehyde, an ammonia source, a nitrification inhibitor, and a urease inhibitor. In still another example, the reaction product can be produced by reacting formaldehyde, urea, an ammonia source, a nitrification inhibitor, and a urease inhibitor. In another example, the reaction product can be produced by reacting formaldehyde, an ammonia source, and a nitrification inhibitor mixed with a urease inhibitor. In still another example, the reaction product can be produced by reacting formaldehyde, urea, an ammonia source, and a nitrification inhibitor mixed with a urease inhibitor. In other words, the urease inhibitor can be reacted into the reaction product of formaldehyde, the ammonia source, the nitrification inhibitor, and optionally urea, mixed with the reaction product, or both.

The reaction product produced under acidic reaction conditions or basic reaction conditions can be mixed or otherwise combined with one or more nitrogen sources to provide a fertilizer product. If the reaction product includes urea reacted with the formaldehyde, ammonia source, and nitrification inhibitor, and optionally the urease inhibitor, the reaction product can be used alone as a nitrogen fertilizer product. In other words, reaction products that include reacted urea and formaldehyde or urea-formaldehyde polymers can be used alone as a nitrogen containing fertilizer product.

The reaction product can be mixed, blended, or otherwise combined with the one or more nitrogen sources to form the fertilizer. For example, the reaction product can be mixed with the one or more nitrogen sources in a vessel or container to provide the fertilizer. Similarly, the one or more nitrogen sources can be mixed, blended, or otherwise combined with the reaction product to form the fertilizer. For example, the nitrogen source can be mixed with the reaction product in a vessel or container to provide the fertilizer. The amount of the reaction product and the one or more nitrogen sources can vary, and the amount of the reaction product can be measured in terms of the amount of nitrogen contained in the nitrogen source(s). For example, the amount of reaction product in the fertilizer can range from about 0.1 wt % to about 25 wt %, based on the total amount of nitrogen in the one or more nitrogen sources in the fertilizer. In another example, the amount of reaction product in the fertilizer can range from a low of about 0.5 wt %, about 1 wt %, about 2 wt %, about 3 wt %, about 4 wt %, or about 5 wt % to a high of about 10 wt %, about 12 wt %, about 15 wt %, about 18 wt %, about 20 wt %, or about 25 wt %, based on the total amount of nitrogen in the one or more nitrogen sources in the fertilizer. In another example, the amount of reaction product in the fertilizer can range from about 0.5 wt % to about 3 wt %, about 5 wt % to about 15 wt %, about 8 wt % to about 12 wt %, or about 10 wt % to about 20 wt %.%, based on the total amount of nitrogen in the one or more nitrogen sources in the fertilizer.

In a specific example, a fertilizer product containing 907 kg (2,000 lbs) of a urea ammonium nitrate solution containing 32 wt % nitrogen (32% UAN) could contain 2.9 kg (6.4 lbs) or 1 wt % of the reaction product, based on the total amount of nitrogen in the UAN solution. In another specific example, a fertilizer product containing 1,000 kg (2,200 lbs) of a 32% UAN solution could contain about 32 kg (70.5 lbs) or 10 wt % of the reaction product, based on the total amount of nitrogen in the UAN solution. In yet another specific example, a fertilizer product containing about 1,000 kg (2,200 lbs) of anhydrous ammonia, which has an 82 wt % nitrogen content, could contain about 82 kg (181 lbs) or about 10 wt % of the reaction product, based on the total amount of nitrogen in the anhydrous ammonia.

In another example, the nitrogen source can be mixed with the reaction product within the soil, on or about the surface of the soil, or a combination thereof. For example, the nitrogen source can be or include animal waste such as urine and/or manure deposited on and/or in the soil. In another example, the nitrogen source can be or include a fertilizer product previously applied to the soil. As such, the reaction product can be applied to the soil and mixed with the animal waste and/or previously applied fertilizer(s) on the surface of and/or within the soil. The reaction product can be applied to the soil before, during, and/or after the animal waste and/or fertilizer(s) are deposited on/in the soil. In another example, the nitrogen source can be or include animal waste such as urine and/or manure that can be collected and placed within a holding tank, pond, or the like, and the reaction product can be added to the animal waste to provide a mixture. The mixture can then be deposited about the soil to act as a fertilizer therein.

If the nitrogen source includes animal waste such as urine and/or manure, the amount of the reaction product mixed or otherwise combined with the nitrogen source that includes the animal waste can range from about 0.1 wt % to about 25 wt %, based on the total amount of nitrogen in the one or more nitrogen sources. In another example, the amount of reaction product mixed or otherwise combined with the nitrogen source that includes the animal waste can range from a low of about 0.5 wt %, about 1 wt %, about 2 wt %, about 3 wt %, about 4 wt %, or about 5 wt % to a high of about 10 wt %, about 12 wt %, about 15 wt %, about 18 wt %, about 20 wt %, or about 25 wt %, based on the total amount of nitrogen in the one or more nitrogen sources in the fertilizer. In another example, the amount of reaction product mixed or otherwise combined with the nitrogen source that includes the animal waste can range from about 0.5 wt % to about 3 wt %, about 5 wt % to about 15 wt %, about 8 wt % to about 12 wt %, or about 10 wt % to about 20 wt %, based on the total amount of nitrogen in the one or more nitrogen sources in the fertilizer. In another example, in addition to or in lieu of animal waste as providing the nitrogen source, the nitrogen source can be provided from one or more previous applications of a fertilizer that contained urea, ammonia, ammonium nitrate, or any combination thereof, for example. In other words, the reaction product can be applied to a soil that contains a fertilizer containing urea, ammonia, ammonium nitrate, animal waste(s), or any combination thereof previously applied thereto or a soil to which a fertilizer containing urea, ammonia, ammonium nitrate, animal waste(s), or any combination thereof may be expected to be applied thereto.

In another example, the reaction product can be mixed or combined with one or more quick release nitrogen sources and one or more controlled release nitrogen sources to provide the fertilizer. For example, a fertilizer product can include a mixture of the reaction product, a urea-formaldehyde polymer (UF), and an aqueous solution of urea (U), an aqueous solution of ammonium nitrate (AN), an aqueous solution of urea-ammonium nitrate (UAN), or any combination thereof. For example, the fertilizer product containing both quick release and controlled release nitrogen sources can include the controlled release nitrogen source(s) in an amount ranging from a low of about 10 wt %, about 20 wt %, about 30 wt %, or about 40 wt % to a high of about 60 wt %, about 70 wt %, about 80 wt %, about 90 wt %, or about 95 wt %, based on the total weight of nitrogen in both the controlled release nitrogen source and the quick release nitrogen source. The fertilizer product containing both quick release and controlled release nitrogen sources can have a concentration of the reaction product ranging from about 0.5 wt % to about 25 wt %, about 1 wt % to about 15 wt %, about 5 wt % to about 20 wt %, or about 1 wt % to about 20 wt %, based on the total nitrogen in the quick release nitrogen source(s). In another example, the fertilizer product can include an aqueous ureaformaldehyde solution (UF) mixed with a quick release nitrogen source at a weight ratio from about 90:10 to about 10:90, about 80:20 to about 20:80, about 75:25 to about 25:75, or about 30:70 to about 70:30 and the reaction product can be present in an amount ranging from about 1 wt % to about 20 wt % based on the total amount of nitrogen in the quick release nitrogen source.

One or more fertilizer nutrient additives can be mixed or combined with the reaction product and/or a reaction product and nitrogen source mixture. Illustrative fertilizer nutrient additives can include, but are not limited to, phosphorous and/or potassium based nutrients. A commercially available fertilizer nutrient can include, for example, K-Fol 0-40-53, which is a solution that contains 40 wt % phosphate and 53 wt % potassium, which is manufactured and distributed by GBS Biosciences, LLC.

One or more pesticides, herbicides, fungicides, or any combination thereof, can also be mixed or combined with the reaction product and/or a reaction product and nitrogen source mixture. Suitable pesticides, herbicides, and fungicides are well known.

Depending on the particular composition of the reaction product and/or the particular composition of the fertilizer product containing the reaction product and one or more nitrogen sources application rates to soil can widely vary. For example, a fertilizer product containing the reaction product and one or more nitrogen sources and having a concentration of the reaction product ranging from about 0.5 wt % to about 25 wt %, based on the total amount of nitrogen in the one or more nitrogen sources, can be applied to a soil in an amount ranging from a low of about 5 kg/hectare (kg/ha), about 10 kg/ha, about 20 kg/ha, about 30 kg/ha, about 40 kg/ha, or about 50 kg/ha to a high of about 100 kg/ha, about 150 kg/ha, about 200 kg/ha, about 250 kg/ha, about 300 kg/ha, about 350 kg/ha, or about 400 kg/ha. In another example, the reaction product alone can be applied to a soil in an amount ranging from a low of about 1 kg/ha, about 3 kg/ha, about 5 kg/ha, about 7 kg/ha, or about 10 kg/ha to a high of about 30 kg/ha, about 35 kg/ha, about 40 kg/ha, about 45 kg/ha, about 50 kg/ha, about 60 kg/ha, about 70 kg/ha, or about 80 kg/ha. The particular amount of the reaction product, when applied alone to the soil, can be based, at least in part, on the amount of nitrogen within and/or on the soil and/or the amount of nitrogen expected to be deposited on and/or within the soil.

EXAMPLES

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

Incubation Tests

Three reaction products (Ex. 1-3) mixed with a urea solution to produce a liquid fertilizer solution were prepared and incubation tests were conducted. A comparative example of a urea only solution, i.e., a urea solution without a reaction product (C1), and a comparative example of a urea solution mixed with dicyandiamide (DCD) (C2) were also prepared and evaluated. For comparative example C2, the urea solution mixed with DCD was not reacted. In other words, the DCD was mixed with the urea solution to provide the fertilizer. A Control was also prepared that consisted of soil, i.e., no nitrogen source nor reaction product was added.

For Ex. 1, the reaction product was prepared according to the following procedure. In a reaction vessel, about 1,640 g of a 50 wt % solution of formaldehyde was added at room temperature and the temperature was increased to 50° C. with a heating coil. Over a period of about 15 minutes the temperature was reduced to 25° C. (about 1.7° C. per minute) with a cooling coil and 1,150 grams of DCD was added. The temperature was raised to 60° C. and then about 208 g of ammonium chloride was slowly added in small amounts over a period of about 30 minutes. The addition of ammonium chloride caused an exothermic reaction and produced a reaction product, i.e., the reaction product. During the addition of the ammonium chloride the temperature of the reaction product was allowed to increase to 80° C. and was held for about 10 minutes at 80° C. and then cooled to room temperature. The final fertilization additive had a pH of 5.1.

For Ex. 2, the reaction product was prepared according to the following procedure. In a reaction vessel, about 1,290 g of a 50 wt % solution of formaldehyde was added at room temperature and the temperature was increased and maintained between 30° C. and 50° C. A first portion of ammonium hydroxide (60 g) was then added to the reaction vessel and the temperature of the mixture was maintained below 60° C. About 260 g of DCD was then added to the reaction vessel and the temperature of the mixture was adjusted to between 35° C. and 50° C. About 1,378 g urea was then added to the reaction vessel. A second portion of ammonium hydroxide (250 g) was then added to the reaction vessel. The temperature of the reaction mixture was allowed to exothermically increase to about 90° C. for less than 30 minutes and the temperature was reduced to 85° C. and held for 120 minutes. After heating the reaction mixture to 85° C., distillation was started and carried out until 416.1 g of distillate was removed from the reaction mixture. A 25 wt % solution of sodium hydroxide was added throughout the reaction and distilled as needed to adjust the pH. The pH of the reaction mixture was kept above 8.4 throughout the reaction. After distillation the reaction mixture was cooled down to provide the reaction product for Ex. 2. The reaction product for Ex. 2 had a final pH of 9.12.

For Ex. 3, the reaction product was prepared according to the following procedure. In a reaction vessel, about 555 g of a 50 wt % solution of formaldehyde was added at room temperature. About 260 g of ammonium hydroxide was then slowly added to the reaction vessel and the temperature was allowed to exothermically increase to 80° C. About 186 g of DCD was then added to the reaction vessel and the temperature of the reaction mixture was maintained at 75° C. for about 20 minutes. The reaction mixture was then cooled to produce the reaction product for Ex. 3. A 25 wt % solution of sodium hydroxide was added throughout the reaction as needed to adjust the pH. The pH of the reaction mixture was kept above 8.4 throughout the reaction. The reaction product for Ex. 3 had a final pH of 7.81.

Incubation tests were performed using each Example 1-3 to evaluate the nitrogen transformations for each sample. The effect of each reaction product (Ex. 1-3) on the nitrogen concentration in the soil as both ammonium-nitrogen and nitrate-nitrogen were evaluated at three different concentrations of the reaction products. More particularly, the concentration of DCD for a first set of samples was 0.75 wt % (Table 1), a second set of samples was 1.5 wt % (Table 2), and a third set of samples was 3 wt % (Table 3), where the weight percents of the DCD concentration are based on the total weight of nitrogen in the urea solution.

The soil used in the incubation tests was Greenville loamy soil (clay-loam, siliceous, thermic Plinthic Kandiudults). The soil had a pH of 6.76, an ammonium-nitrogen concentration of 1.3 ppm, and a nitrate-nitrogen concentration of 2.4 ppm. The soil had a total nitrogen concentration of 0.062 wt % prior to adding any of the fertilizer solutions, an organic matter concentration of 1.14 wt %, a CEC of 16.2 cmol/kg, phosphorus concentration of 3.55 ppm, a sulfur concentration of 3.5 ppm, and a zinc concentration of 0.11 ppm. The phosphorous and sulfur concentrations were determined according to the Bray-1 test. The zinc concentration was determined according to the DTPA (diethylenetriaminepentaacetic acid) soil test.

Prior to introducing the fertilizer solutions, each soil sample was incubated for 1 week at 24° C. and had an initial moisture at field capacity. As used herein, the term "field capacity," refers to the drained upper limit or moisture content below which there is no free drainage flow. During the one week incubation period the moisture was reduced to about 80%. For each test 50 g of soil was placed into a cup and each cup was covered with a lid having four holes to allow for aeration and to minimize water loss.

Stock solutions containing each example were prepared by adding 2.15 g of urea and the corresponding amount of DCD (C2) or the reaction product (Ex. 1-3) to a 500 mL beaker to provide samples having 0.75 wt % (Table 1), 1.5 wt % (Table 2), and 3 wt % (Table 3) DCD based on the total nitrogen concentration in the urea solution. After adding the urea (C1), urea plus DCD (C2), and urea plus the reaction products (Ex. 1-3), to the beakers, the contents of each beaker were diluted to 500 mL with distilled water to provide a stock solution. For the examples shown in Tables 1-3 below, 5 mL of the corresponding stock solution were introduced via a pipette onto each 50 g soil sample and the cover was placed thereon. The amount of nitrogen contained in each example (Ex. 1-3, C1, and C2) was 10 mg and the nitrogen was in the form of urea. The soil had at least an 80% field moisture capacity for each sample and if needed additional distilled water was used in order to achieve the 80% field moisture capacity.

Soil extractions were made at 1 week intervals in order to determine the amount of ammonium-nitrogen and nitrate-nitrogen in each example. A total of 10 extractions were performed, namely at time=0 and after the 1st week, 2nd week, 3rd week, 4th week, 5th week, 6th week, 7th week, 8th week, and the 10th week. Extracting the nitrogen from each sample was done by adding 100 mL of a 2M potassium chloride (KCl) solution to each soil sample to be tested. The amount of nitrogen in the form of ammonium ($NH_4^+$) and nitrate ($NO_3^-$) were then determined.

The amount of ammonium was determined using the well known Berthelot reaction in which ammonia is chlorinated to monochloroamine, which then reacts with salicylate to form 5-aminosalicylate. After oxidation and oxidative coupling, a green color complex was formed which was measured at 660 nm using a spectrophotometer.

The determination of nitrate was determined based on the reduction of nitrate ($NO_3$) to nitrogen dioxide ($NO_2$) by hydrazinium sulfate or cadmium metal. Then nitrite was determined by diazotizing with sulfanilamide and coupling with a-naphthylethylenediamine dihydrochloroide to form a colored azo dye which was measured at 540 nm with a spectrophotometer.

Table 1 shows the results for samples that had 0.75 wt % DCD (C2 and Ex. 1-3) based on a total weight of nitrogen in the urea solution. Table 2 shows the results for samples that had 1.5 wt % DCD (C2 and Ex. 1-3) based on a total weight of nitrogen in the urea solution. Finally, Table 3 shows the results for samples that had 3% wt DCD (C2 and Ex. 1-3) based on a total weight of nitrogen in the urea solution.

TABLE 1

| | | Control | Urea Only (C1) | Urea + DCD (C2) | Ex. 1 | Ex. 2 | Ex. 3 |
|---|---|---|---|---|---|---|---|
| Week 0 | Ammonium ($NH4^+$), mg N | 0.16 | 0.39 | 0.38 | 0.37 | 0.43 | 0.35 |
| | Nitrate ($NO_3^-$), mg N | 1.19 | 1.27 | 1.19 | 1.24 | 1.18 | 1.17 |
| Week 1 | Ammonium ($NH4^+$), mg N | 0.13 | 6.81 | 8.08 | 7.40 | 7.65 | 8.07 |
| | Nitrate ($NO_3^-$), mg N | 1.22 | 3.61 | 2.39 | 3.22 | 2.89 | 2.36 |
| Week 2 | Ammonium ($NH4^+$), mg N | 0.02 | 4.21 | 6.95 | 5.21 | 5.55 | 6.42 |
| | Nitrate ($NO_3^-$), mg N | 1.27 | 6.37 | 3.50 | 5.35 | 5.08 | 4.02 |
| Week 3 | Ammonium ($NH4^+$), mg N | 0.01 | 2.14 | 5.68 | 2.90 | 3.95 | 4.33 |
| | Nitrate ($NO_3^-$), mg N | 1.26 | 8.38 | 4.73 | 7.67 | 6.39 | 6.01 |
| Week 4 | Ammonium ($NH4^+$), mg N | 0.01 | 0.18 | 4.73 | 1.90 | 3.08 | 3.42 |
| | Nitrate ($NO_3^-$), mg N | 1.30 | 10.45 | 5.60 | 8.64 | 7.37 | 6.98 |
| Week 5 | Ammonium ($NH4^+$), mg N | 0.07 | 0.08 | 1.68 | 0.43 | 1.37 | 1.43 |
| | Nitrate ($NO_3^-$), mg N | 1.35 | 10.69 | 8.92 | 10.25 | 9.40 | 9.14 |
| Week 6 | Ammonium ($NH4^+$), mg N | 0.08 | 0.08 | 0.12 | 0.09 | 0.11 | 0.09 |
| | Nitrate ($NO_3^-$), mg N | 1.48 | 10.66 | 10.50 | 10.69 | 10.93 | 10.77 |
| Week 7 | Ammonium ($NH4^+$), mg N | 0.09 | 0.09 | 0.11 | 0.11 | 0.10 | 0.11 |
| | Nitrate ($NO_3^-$), mg N | 1.31 | 10.85 | 10.46 | 10.66 | 10.67 | 10.72 |
| Week 8 | Ammonium ($NH4^+$), mg N | 0.09 | 0.10 | 0.11 | 0.09 | 0.08 | 0.09 |
| | Nitrate ($NO_3^-$), mg N | 1.40 | 10.97 | 10.76 | 10.88 | 10.98 | 10.73 |
| Week 10 | Ammonium ($NH4^+$), mg N | 0.03 | 0.04 | 0.06 | 0.05 | 0.05 | 0.05 |
| | Nitrate ($NO_3^-$), mg N | 1.46 | 10.98 | 10.86 | 10.84 | 11.22 | 10.82 |

As shown in Table 1, the urea and reaction product solutions (Ex. 1-3) having a nitrification inhibitor (DCD) concentration of 0.75 wt % based on the amount of nitrogen in the urea performed substantially better than the urea only solution (C 1) and similarly to the urea+DCD solution (C2). For all the Examples 1-3 the amount of nitrogen in the form of ammonium ($NH4^+$) was substantially increased as compared to the urea only solution (C1) for weeks 3 through 5. At about the 6th week the ammonium ($NH4^+$) concentration for all examples dropped off. Similarly, for all the Examples 1-3 the amount of nitrogen in the form of nitrate ($NO3^-$) was substantially less than the urea only solution (C1) for weeks 3 through 5. At about the 6th week the nitrate ($NO3^-$) concentration leveled off. The nitrification inhibition exhibited by Ex. 1-3 performed similarly to the urea+DCD solution (C2) in inhibiting the nitrification process.

TABLE 2

1.5 wt. % DCD Based on the Weight of Nitrogen in the Fertilizer

|   |   | Control | Urea Only (C1) | Urea + DCD (C2) | Ex. 1 | Ex. 2 | Ex. 3 |
|---|---|---|---|---|---|---|---|
| Week 0 | Ammonium ($NH_4^+$), mg N | 0.16 | 0.39 | 0.38 | 0.28 | 0.27 | 0.36 |
|  | Nitrate ($NO_3^-$), mg N | 1.19 | 1.27 | 1.20 | 1.18 | 1.24 | 1.28 |
| Week 1 | Ammonium ($NH_4^+$), mg N | 0.13 | 6.81 | 8.69 | 7.51 | 8.60 | 8.55 |
|  | Nitrate ($NO_3^-$), mg N | 1.22 | 3.61 | 1.86 | 2.76 | 2.17 | 1.91 |
| Week 2 | Ammonium ($NH_4^+$), mg N | 0.02 | 4.21 | 7.97 | 5.42 | 7.08 | 7.80 |
|  | Nitrate ($NO_3^-$), mg N | 1.27 | 6.37 | 2.44 | 5.03 | 3.40 | 2.50 |
| Week 3 | Ammonium ($NH_4^+$), mg N | 0.01 | 2.14 | 7.20 | 3.99 | 6.20 | 6.91 |
|  | Nitrate ($NO_3^-$), mg N | 1.26 | 8.38 | 3.19 | 6.28 | 4.31 | 3.41 |
| Week 4 | Ammonium ($NH_4^+$), mg N | 0.01 | 0.18 | 6.29 | 2.55 | 4.43 | 5.42 |
|  | Nitrate ($NO_3^-$), mg N | 1.30 | 10.45 | 3.95 | 7.86 | 5.93 | 4.82 |
| Week 5 | Ammonium ($NH_4^+$), mg N | 0.07 | 0.08 | 4.23 | 1.46 | 3.67 | 3.61 |
|  | Nitrate ($NO_3^-$), mg N | 1.35 | 10.69 | 6.20 | 9.02 | 6.95 | 6.92 |
| Week 6 | Ammonium ($NH_4^+$), mg N | 0.08 | 0.08 | 1.24 | 0.10 | 0.54 | 0.96 |
|  | Nitrate ($NO_3^-$), mg N | 1.48 | 10.66 | 9.10 | 10.61 | 10.15 | 9.25 |
| Week 7 | Ammonium ($NH_4^+$), mg N | 0.09 | 0.09 | 0.51 | 0.11 | 0.11 | 0.11 |
|  | Nitrate ($NO_3^-$), mg N | 1.31 | 10.85 | 10.02 | 10.54 | 10.94 | 10.25 |
| Week 8 | Ammonium ($NH_4^+$), mg N | 0.09 | 0.10 | 0.11 | 0.09 | 0.08 | 0.08 |
|  | Nitrate ($NO_3^-$), mg N | 1.40 | 10.97 | 10.68 | 10.92 | 11.01 | 10.50 |
| Week 10 | Ammonium ($NH_4^+$), mg N | 0.03 | 0.04 | 0.05 | 0.04 | 0.04 | 0.04 |
|  | Nitrate ($NO_3^-$), mg N | 1.46 | 10.98 | 10.63 | 10.74 | 10.85 | 10.61 |

As shown in Table 2, the urea and reaction product solutions (Ex. 1-3) having a nitrification inhibitor (DCD) concentration of 1.5 wt % based on the total amount of nitrogen in the urea solution performed substantially better than the urea only solution (C 1) and similarly to the urea+DCD solution (C2). For all the Examples 1-3 the amount of nitrogen in the form of ammonium ($NH_4^+$) was substantially greater than the urea only solution (C 1) for weeks 3 through 5. Ex. 2 and Ex. 3 showed a substantial increase in the amount of nitrogen present in the form of ammonium ($NH_4^+$) through the 6th week. Similarly, for all the Examples 1-3 the amount of nitrogen in the form of nitrate ($NO3^-$) was substantially less than the urea only solution (C1) for weeks 3 through 5. Ex. 2 and Ex. 3 continued to show a substantial reduction in the concentration of nitrogen in the form of nitrate ($NO3^-$) through the 6th week. The nitrification inhibition exhibited by Ex. 1-3 (especially Ex. 2 and 3) performed similarly to the urea+DCD solution (C2) in inhibiting the nitrification process.

TABLE 3

3 wt. % DCD Based on the Weight of Nitrogen in the Fertilizer

|   |   | Control | Urea Only (C1) | Urea + DCD (C2) | Ex. 1 | Ex. 2 | Ex. 3 |
|---|---|---|---|---|---|---|---|
| Week 0 | Ammonium ($NH_4^+$), mg N | 0.16 | 0.39 | 0.29 | 0.34 | 0.35 | 0.40 |
|  | Nitrate ($NO_3^-$), mg N | 1.19 | 1.27 | 1.17 | 1.15 | 1.19 | 1.12 |
| Week 1 | Ammonium ($NH_4^+$), mg N | 0.13 | 6.81 | 8.74 | 8.06 | 9.05 | 9.01 |
|  | Nitrate ($NO_3^-$), mg N | 1.22 | 3.61 | 1.60 | 2.26 | 2.28 | 1.64 |
| Week 2 | Ammonium ($NH_4^+$), mg N | 0.02 | 4.21 | 8.20 | 7.13 | 8.55 | 8.28 |
|  | Nitrate ($NO_3^-$), mg N | 1.27 | 6.37 | 2.07 | 3.35 | 2.36 | 2.27 |
| Week 3 | Ammonium ($NH_4^+$), mg N | 0.01 | 2.14 | 7.53 | 6.36 | 7.80 | 7.63 |
|  | Nitrate ($NO_3^-$), mg N | 1.26 | 8.38 | 2.78 | 4.07 | 3.10 | 2.96 |
| Week 4 | Ammonium ($NH_4^+$), mg N | 0.01 | 0.18 | 6.05 | 4.08 | 6.20 | 5.83 |
|  | Nitrate ($NO_3^-$), mg N | 1.30 | 10.45 | 4.10 | 6.22 | 4.56 | 4.49 |
| Week 5 | Ammonium ($NH_4^+$), mg N | 0.07 | 0.08 | 5.10 | 2.81 | 5.21 | 4.37 |
|  | Nitrate ($NO_3^-$), mg N | 1.35 | 10.69 | 5.18 | 7.76 | 5.86 | 6.14 |
| Week 6 | Ammonium ($NH_4^+$), mg N | 0.08 | 0.08 | 1.82 | 0.78 | 2.63 | 1.89 |
|  | Nitrate ($NO_3^-$), mg N | 1.48 | 10.66 | 8.40 | 9.74 | 8.38 | 8.66 |
| Week 7 | Ammonium ($NH_4^+$), mg N | 0.09 | 0.09 | 0.61 | 0.11 | 0.41 | 0.12 |
|  | Nitrate ($NO_3^-$), mg N | 1.31 | 10.85 | 9.58 | 10.48 | 10.74 | 10.55 |
| Week 8 | Ammonium ($NH_4^+$), mg N | 0.09 | 0.10 | 0.20 | 0.09 | 0.41 | 0.11 |
|  | Nitrate ($NO_3^-$), mg N | 1.40 | 10.97 | 10.35 | 10.73 | 10.91 | 10.74 |
| Week 10 | Ammonium ($NH_4^+$), mg N | 0.03 | 0.04 | 0.05 | 0.04 | 0.04 | 0.04 |
|  | Nitrate ($NO_3^-$), mg N | 1.46 | 10.98 | 10.66 | 10.85 | 11.35 | 10.88 |

As shown in Table 3, the urea and reaction product solutions (Ex. 1-3) having a nitrification inhibitor (DCD) concentration of 3 wt % based on the total amount of nitrogen in the urea solution performed substantially better than the urea only solution (C1) and similarly to the urea+DCD solution (C2). For all the Examples 1-3 the amount of nitrogen in the form of ammonium ($NH_4^+$) was substantially greater than the urea only solution (C1) for weeks 1 through 6. Ex. 2 showed a substantial increase in the amount of nitrogen present in the form of ammonium ($NH_4^+$) through the 8th week. Similarly, for all the Examples 1-3 the amount of nitrogen in the form of nitrate ($NO3^-$) was substantially less than the urea only solution (C1) for weeks 1 through 6. The nitrification inhibition exhibited by Ex. 1-3 (especially Ex. 2 and 3) performed similarly to the urea+DCD solution (C2) in inhibiting the nitrification process.

It has been surprisingly and unexpectedly discovered that a reaction product of the nitrification inhibitor with formaldehyde and an ammonia source (Ex. 1 and Ex. 3) and a reaction product of the nitrification inhibitor with formaldehyde, urea, and an ammonia source (Ex. 2) reduces the rate at which nitrification of the nitrogen in the fertilizer occurs. As shown in Tables 1-3, the reaction products of Examples 1-3 showed a substantial decrease in the rate at which nitrification occurred in the urea only solution (C 1) and performed similarly to the urea+DCD solution (C2).

Leaching Tests

One reaction product (Ex. 4) mixed with a urea solution to produce a liquid fertilizer solution was prepared and leaching tests were conducted. In addition to Ex. 4, two comparative examples (C3 and C4) were also prepared. Comparative example C3 was a mixture of urea and DCD. Comparative example C4 was a mixture of urea ammonium nitrate (UAN), DCD, and a urea-formaldehyde polymer (UFP).

The reaction product used to produce the liquid fertilizer solution of Ex. 4 was the same reaction product used in Ex. 2. For Ex. 4 and C3, a stock urea solution was prepared by dissolving 152.6 g urea in distilled water and diluting to 1 L. 50 mL of the stock urea solution was then added to each of two 500 mL volumetric flasks. To prepare the fertilizer solution of Ex. 4, about 1,008.9 mg of the reaction product of Ex. 4 was added to the first volumetric flask and distilled water was added to bring the volume to 500 mL. To prepare the fertilizer solution of comparative example C3, about 106.2 mg of DCD was added to the second volumetric flask and distilled water was added to bring the volume to 500 mL.

The urea-formaldehyde polymer (UFP) of comparative example C4 was prepared according to the following procedure. In a reaction vessel, about 1,884 g of a 50% solution of formaldehyde was added at room temperature and the temperature was increased and maintained between about 30° C. and about 50° C. A first portion of ammonium hydroxide (about 70 g) was then added to the reaction vessel and the temperature of the mixture was maintained below about 60° C. About 942 grams of urea was then added to the reaction vessel and the temperature of the mixture was adjusted to between about 35° C. and about 50° C. A second portion of ammonium hydroxide (about 403 g) was then added to the reaction vessel. The temperature of the reaction mixture was allowed to exothermically increase to about 90° C. for less than 30 minutes and the temperature was reduced to about 85° C. and held for about 120 minutes during which time distillation was started and carried out until about 921 g of distillate was removed form the reaction mixture. A 25 wt % solution of sodium hydroxide was added throughout the reaction and distillation as needed in order to maintain the pH of the reaction mixture above about 8.4 throughout the reaction. After distillation, the reaction mixture was cooled down to provide a reaction product of the ureaformaldehyde polymer (UFP), which had a final pH of about 10.2 and a nitrogen concentration of about 22 wt % based on the weight of the reaction product.

A urea-formaldehyde polymer/urea ammonium nitrate (UFP/UAN) solution was prepared by blending about 73.3 g of urea ammonium nitrate (UAN) having a nitrogen concentration of about 32 wt % with about 26.7 g of the urea-formaldehyde polymer (UFP) to produce an 80:20 blend where about 80% of the nitrogen was in the UAN and about 20% of the nitrogen was in from the UFP.

A final solution containing DCD and the UFP/UAN solution was then prepared. About 12.2 g of the UAN/UFP solution (about 29.1% N) was then added to a 500 mL volumetric flask along with about 106.2 mg of DCD. The flask was filled to 500 mL using distilled water. This UAN/UFP/DCD solution was used as the fertilizer of comparative example C4.

Table 4 below summarizes the amount of each nitrification inhibitor included in Ex. 4, C3, and C4.

TABLE 4

Nitrification Inhibitor Amounts

| Example | Percent Inhibitor (wt % Inhibitor/wt % Nitrogen) | Amount Inhibitor added to 500 mL Flasks (mg) | Amount applied per column in 50 mL (mg Inhibitor) | Total Amount of DCD (mg) |
|---|---|---|---|---|
| Ex. 4 | 28.5 | 1,008.9 | 100.9 | 10.6 |
| C3 | 3.0 | 106.2 | 10.6 | 10.6 |
| C4 | 3.0 | 106.2 | 10.6 | 10.6 |

The leaching tests were conducted on two types of soil and each example (Ex. 4, C3, and C4) was replicated 3 times. As such, the total number of leaching columns was equal to 3 nitrogen sources×2 types of soil×3 replicates for a total of 18 leaching columns.

The first type of soil used in the leaching tests was Greenville clay loam soil (a fine, kaolinitic, thermic Rhodie Kandiudults) having the following properties: a soil pH of about 6.82, an ammonium-N concentration of about 6.3 ppm, a nitrate-N concentration of about 3.1 ppm, 0.060 wt % total nitrogen, 1.14 wt % organic matter, a cation exchange capacity (CEC) of about 16.2 cmol kg-1, a phosphorous concentration (Bray-I P) of 3.55 ppm, a sulfur concentration of 3.5 ppm, and a diethylenetriaminepentaacetic acid-extractable zinc concentration (DTP A-Zn) of 0.11 ppm. The Greenville soil has optimum pH for nitrification, moderate texture and a low enough N content to show the effect of added N fertilizer.

The second type of soil used in the leaching tests was Tifton sandy loam soil (a fineloamy, siliceous, thermic Plinthic Kandiudults) having the following properties; a soil pH of about 4.90, about 1.15 wt % organic matter, an ammonium-N concentration of about 4.1 ppm, a nitrate-N concentration of about 9.0 ppm, about 0.038 wt % total nitrogen, a CEC of about 1.8 cmol kg$^{-1}$, and about 79 wt % sand.

The leaching columns had an inner diameter of 15 cm, a height of 30 cm, and were kept at room temperature, i.e., between about 20° C. and 24° C. Each leaching column had the bottom 5 cm filled with about 800 g of acid-washed sand and the rest of the column was uniformly filled with about 6 kg of the appropriate soil. The sand was washed with 1 M HCl, rinsed with de-ionized water, and spread out to dry before being put in the leaching columns.

The duration of the experiment was 10 weeks (2 weeks before fertilizer application plus a 7 week period of water addition plus final week of drying cycle). The soil used in the leaching columns had a soil moisture content at 50% of field capacity for three weeks before the start of the experiment, i.e., before loading into the leaching columns. The two types of soil differed in field capacity moisture content—the Greenville soil had a field capacity moisture content of 24.5% and the Tifton soil had field capacity moisture content of 11.52%.

The total amount of nitrogen (N) applied as either urea or UAN+UFP to the soil in the leaching columns was equal to about 200 kg N/ha or about 354 mg N/leaching column. In other words, the total amount of nitrogen (N) applied to each leaching column was equal to about 354 mg.

After application of the fertilizer/inhibitor (Ex. 4, C3, and C4), the leaching columns were maintained at about 80-90% field capacity moisture content for the first four days. On the fifth through the seventh days (days 5-7), each leaching column received 14 mm per day water (250 mL per day)

delivered uniformly over the soil surface. The three days of water addition were followed by two dry days (days 8-9) to ensure soil moisture in none of the leaching columns exceeded field capacity for a prolonged period of time. The three-day watering followed by two dry day cycles was repeated up to day 20. From then on a three-day watering followed by four dry days was followed until the last water application on day 50. The last drying continued to the termination of the experiment (on day 57).

Leachate from the Greenville clay loam soil was analyzed for DCD about every two days. Table 5 shows the Mean Daily DCD concentration (ppm), Quantity Leached (mg DCD per day), DCD Recovery (percent of DCD added to soil that was recovered in the leachate), and DCD in the Soil (percent of DCD that was not leached from the soil) for the Greenville clay loam soil.

TABLE 5

DCD Analysis Results - Greenville Clay Loam Soil

| Example | DCD Mean Daily Leach (ppm) | DCD Mean Daily Leach (mg) | DCD Recovered in Leachate (%) | DCD That Remained in Soil |
|---|---|---|---|---|
| Ex. 4 | 1.9 | 0.0067 | 15.4 | 84.6 |
| C3 | 3.23 | 0.2830 | 61.4 | 38.6 |
| C4 | 3.16 | 0.2760 | 59.8 | 40.2 |

As shown in Table 5, the fertilizer of Ex. 4, i.e., the mixture of urea and the reaction product surprisingly and unexpectedly substantially outperformed both the urea/DCD solution (C3) and the UAN/UFP/DCD solution (C4) for inhibiting leaching of the DCD. The total DCD leaching loss for the urea and reaction product solution (Ex. 4) was 42 times lower than the urea/DCD solution (C3) and 41 times lower than the UAN/UFP/DCD solution (C4). Said another way, the urea and reaction product solution (Ex. 4) maintained 84.6% of the DCD applied to the soil within the soil, while only 15.4% of the DCD leached out of the soil. In contrast, the comparative examples C3 and C4 maintained only about 38.6% and about 40.2% of the DCD applied to the soil within the soil. Accordingly, Table 5 clearly shows that Ex. 4 performed substantially superior to both comparative examples (C3 and C4) that had about 61.4% and about 59.8% of the DCD applied to the soil, respectively, leached therefrom.

Leachate from the Tifton sandy loam soil was also analyzed for DCD about every two days. Table 6 shows the Mean Daily DCD concentration (ppm), Quantity Leached (mg DCD per day), DCD Recovery (percent of DCD added to soil that was recovered in the leachate), and DCD in the Soil (percent of DCD that was not leached from the soil) for the Tifton sandy loam soil.

TABLE 6

DCD Analysis Results - Tifton Sandy Loam Soil

| Example | DCD Mean Daily Leach (ppm) | DCD Mean Daily Leach (mg) | DCD Recovered in Leachate (%) | DCD That Remained in Soil |
|---|---|---|---|---|
| Ex. 4 | 1.94 | 0.0075 | 17.1 | 82.9 |
| C3 | 3.11 | 0.2750 | 59.7 | 40.3 |
| C4 | 3.34 | 0.3090 | 67.1 | 32.9 |

As shown in Table 6, the fertilizer of Ex. 4, i.e., the mixture of urea and the reaction product surprisingly and unexpectedly substantially outperformed both the urea/DCD solution (C3) and the UAN/UFP/DCD solution (C4) for inhibiting leaching of the DCD. The total DCD leaching loss for the urea and reaction product solution (Ex. 4) was about 37 times lower than the urea/DCD solution (C3) and about 41 times lower than the UAN/UFP/DCD solution (C4). Said another way, the urea and reaction product solution (Ex. 4) maintained about 82.9% of the DCD applied to the soil within the soil, while only about 17.1% of the DCD leached out of the soil. In contrast, the comparative examples C3 and C4 maintained only about 40.3% and about 32.9% of the DCD applied to the soil within the soil. Accordingly, Table 6 clearly shows that Ex. 4 performed substantially superior to both comparative examples (C3 and C4) that had about 59.7% and about 67.1% of the DCD applied to the soil, respectively, leached therefrom.

Not wishing to be bound by theory, it is believed that the reaction products produced by reacting the nitrification inhibitor with formaldehyde and an ammonia source (Ex. 1 and Ex. 3) or with formaldehyde, urea, and an ammonia source (Ex. 2) and (Ex. 4) will exhibit superior nitrification inhibition in real world applications as compared to the nitrification inhibitor applied alone or simply mixed with urea (U), ammonium nitrate (AN), and/or urea ammonium nitrate (UAN) because leaching of the nitrification inhibitor into the surrounding soil and away from the nitrogen source in the fertilizer should be reduced or prevented. In other words, reacting the nitrification inhibitor into a polymer should hold or maintain the presence of the nitrification inhibitor at the point of application, i.e., at the roots of the plant, where the fertilizer, e.g., urea, ammonium nitrate, or a mixture of urea and ammonium nitrate, is present, thus providing an improved nitrification inhibitor. As such, the nitrification inhibitor can more effectively inhibit the loss of nitrogen from a nitrogen source through the process of nitrification because tendency for the nitrification inhibitor to leach into the soil and away from the fertilizer is reduced or inhibited.

Additionally, as shown in comparative example C4, simply mixing the nitrification inhibitor (DCD) with a urea-formaldehyde polymer instead of reacting the nitrification inhibitor into the urea formaldehyde polymer (Ex. 1-4) did not decrease the amount of nitrification inhibitor leached from the soil. Indeed, there is no statistical difference between the two comparatives C3 and C4. Accordingly, incorporating the nitrification inhibitor into the reaction product can more effectively inhibit the loss of nitrogen from a nitrogen source through the process of nitrification because tendency for the nitrification inhibitor to leach into the soil and away from the fertilizer is reduced or inhibited.

Also, not wishing to be bound by theory, it is believed that applying a reaction product produced by reacting formaldehyde, an ammonia source, and a nitrification inhibitor, and optionally urea and/or a urease inhibitor to soil or other substrates that already contains or may be expected to contain one or more nitrogen sources can reduce or prevent the loss of at least one of the one or more nitrogen sources through the process of nitrification because the tendency for the nitrification inhibitor to leach into the soil and away from the fertilizer is reduced or inhibited. As such, the reaction product can be applied to a soil that contains or may be expected to contain nitrogen sources such as those introduced to soil from one or more animals via manure and/or urine and/or previous fertilizer applications and the loss of the nitrogen source(s) through nitrification can be reduced or prevented.

Embodiments described herein further relate to any one or more of the following paragraphs:

1. A fertilizer, comprising: a nitrogen source comprising urea, ammonia, ammonium nitrate, or any combination thereof; and a reaction product of formaldehyde, an ammonia source, and a nitrification inhibitor.

2. The fertilizer according to paragraph 1, wherein the reaction product further comprises urea reacted with the formaldehyde, ammonia source, and nitrification inhibitor.

3. The fertilizer according to paragraph 1 or 2, wherein a molar ratio of the formaldehyde to ammonia in the reaction product ranges from about 3:1 to about 9:1 and a molar ratio of the formaldehyde to nitrification inhibitor in the reaction product ranges from about 1:1 to about 3:1.

4. The fertilizer according to any one of paragraphs 1 to 3, wherein the reaction product is produced under acidic reaction conditions and has a pH ranging from about 4 to about 6.

5. The fertilizer according to any one of paragraphs 1 to 4, wherein reacting the formaldehyde, ammonia source, and nitrification inhibitor comprises: combining the formaldehyde and the nitrification inhibitor at a molar ratio from about 1:1 to about 3:1 to produce a first mixture; heating the first mixture to a temperature ranging from about 50° C. to about 80° C.; introducing ammonium chloride to the first mixture to produce a second mixture, wherein the total amount of ammonium chloride introduced to the first mixture provides a formaldehyde to ammonia molar ratio ranging from about 3:1 to about 9:1; heating the second mixture to a temperature ranging from about 70° C. to about 90° C.; and cooling the second mixture to produce the reaction product.

6. The fertilizer according to any one of paragraphs 1 to 5, wherein the reaction product comprises from about 30 mol % to about 70 mol % formaldehyde, from about 5 mol % to about 25 mol % ammonia, and from about 15 mol % to about 45 mol % nitrification inhibitor, based on a total weight of the formaldehyde, the ammonia, and the nitrification inhibitor.

7. The fertilizer according to paragraph 1 or 2, wherein a molar ratio of the formaldehyde to ammonia in the reaction product ranges from about 1:1 to about 8:1 and a molar ratio of the formaldehyde to nitrification inhibitor in the reaction product ranges from about 1:1 to about 7:1.

8. The method according to any one of paragraphs 1, 2, or 7, wherein the reaction product comprises from about 30 mol % to about 80 mol % formaldehyde, from about 5 mol % to about 25 mol % ammonia, and from about 10 mol % to about 35 mol % nitrification inhibitor, based on a total weight of the formaldehyde, the ammonia source, and the nitrification inhibitor.

9. The fertilizer according to any one of paragraphs 1, 2, 7, or 8, wherein the reaction product is produced under alkaline reaction conditions and has a pH ranging from about 8 to about 11.

10. The fertilizer according to any one of paragraphs 1 or 7 to 9, wherein the reaction product is produced by reacting the formaldehyde, ammonia source, and nitrification inhibitor in water under alkaline reaction conditions to yield an aqueous reaction product.

11. The fertilizer according to any one of paragraphs 1 or 7 to 10, wherein the reaction product is produced by reacting the formaldehyde, ammonia source, and nitrification inhibitor at a temperature ranging from about 70° C. to about 95° C. and at a pH ranging from about 7.5 to about 10.5 for a time ranging from about 10 minutes to about 120 minutes.

12. The fertilizer according to paragraph 2, wherein the reaction product is produced by reacting the formaldehyde, urea, ammonia source, and nitrification inhibitor in water under an alkaline reaction condition to yield an aqueous reaction product.

13. The fertilizer according to paragraph 2 or 12, wherein the reaction product is produced by reacting the formaldehyde, urea, ammonia source, and nitrification inhibitor at a temperature ranging from about 70° C. to about 95° C. and at a pH ranging from about 7.5 to about 10.5 for a time ranging from about 10 minutes to about 120 minutes.

14. A method for making a fertilizer, comprising: reacting formaldehyde, an ammonia source, and a nitrification inhibitor under conditions sufficient to produce a reaction product; and combining the reaction product with a nitrogen source to produce a fertilizer, wherein the nitrogen source comprises urea, ammonia, ammonium nitrate, or any combination thereof.

15. A method for reducing nitrification in soil, comprising: reacting formaldehyde, an ammonia source, and a nitrification inhibitor under conditions sufficient to produce a reaction product; applying the reaction product to a soil.

16. The method of paragraph 15, wherein one or more nitrogen sources is disposed within the soil and the reaction product is combined with the one or more nitrogen sources within the soil.

17. The method of paragraph 16, wherein the amount of reaction product applied to the soil ranges from about 1 kg/ha to about 50 kg/ha.

18. The method according to paragraph 16 or 17, wherein the amount of the reaction product applied to the soil ranges from about 1 wt % to about 25 wt %, based on a total amount of nitrogen in the one or more nitrogen sources.

19. The method according to paragraph 14 or 15, further comprising reacting urea with the formaldehyde, ammonia source, and nitrification inhibitor to produce the reaction product.

20. The method according to paragraph 14, wherein the amount of reaction product in the fertilizer ranges from about 0.1 wt % to about 20 wt %, based on a total amount of nitrogen in the nitrogen source.

21. The method according to any one of paragraphs 14 to 20, wherein a molar ratio of the formaldehyde to ammonia in the reaction product ranges from about 3:1 to about 9:1 and a molar ratio of the formaldehyde to nitrification inhibitor in the reaction product ranges from about 1:1 to about 3:1.

22. The method according to any one of paragraphs 14 to 21, wherein the reaction product has a pH ranging from about 4 to about 6.

23. The method according to any one of paragraphs 14 to 22, wherein reacting the formaldehyde, ammonia source, and a nitrification inhibitor comprises: combining the formaldehyde and the nitrification inhibitor at a molar ratio from about 1:1 to about 3:1 to produce a first mixture; heating the first mixture to a temperature ranging from about 50° C. to about 80° C.; introducing ammonium chloride to the first mixture to produce a second mixture, wherein the total amount of ammonium chloride introduced to the first mixture provides a formaldehyde to ammonia molar ratio ranging from about 3:1 to about 9:1; heating the second mixture to a temperature ranging from about 70° C. to about 90° C.; and cooling the second mixture to produce the reaction product.

24. The method according to any one of paragraphs 14 to 23, wherein the reaction product comprises from about 30 mol % to about 70 mol % formaldehyde, from about 5 mol % to about 25 mol % ammonia, and from about 15 mol % to about 45 mol % nitrification inhibitor, based on a total weight of the formaldehyde, the ammonia source, and the nitrification inhibitor.

25. The method according to any one of paragraphs 14 to 20, wherein the reaction product comprises from about 30 mol % to about 80 mol % formaldehyde, from about 5 mol % to about 25 mol % ammonia, and from about 10 mol % to about 35 mol % nitrification inhibitor, based on a total weight of the formaldehyde, the ammonia source, and the nitrification inhibitor.

26. The method according to any one of paragraphs 14 to 20 or 25, wherein a molar ratio of the formaldehyde to ammonia in the reaction product ranges from about 1:1 to about 8:1 and a molar ratio of the formaldehyde to nitrification inhibitor in the reaction product ranges from about 1:1 to about 7:1.

27. The method according to any one of paragraphs 14 to 20, 25, or 26, wherein the reaction product comprises a reaction product produced under alkaline reaction conditions and has a pH ranging from about 8 to about 11.

28. The method according to any one of paragraphs 14 to 20 or 25 to 27, wherein the reaction product is produced by reacting the formaldehyde, ammonia source, and nitrification inhibitor in water under alkaline reaction conditions to yield an aqueous reaction product.

29. The method according to any one of paragraphs 14 to 20 or 25 to 28, wherein the reaction product is produced by reacting the formaldehyde, ammonia source, and nitrification inhibitor at a temperature ranging from about 70° C. to about 95° C. and at a pH ranging from about 7.5 to about 10.5 for a time ranging from about 10 minutes to about 120 minutes.

30. The fertilizer or method according to any one of paragraphs 1 to 29, wherein the nitrogen source comprises urea, ammonia, ammonium nitrate, animal manure, animal urine, or any combination thereof.

31. The fertilizer or method according to any one of paragraphs 1 to 37, wherein the nitrogen source comprises anhydrous ammonia.

32. The fertilizer or method according to any one of paragraphs 1 to 31, wherein the nitrification inhibitor comprises 2-chloro-6-trichloromethyl-pyridine, 5-ethoxy-3-trichloromethyl-1,2,4-thiadiazol, dicyandiamide, 2-amino-4-chloro-6-methyl-pyrimidine, 1,3-benzothyiazole-2-thiol, 4-amino-N-1,3-thiazol-2-ylbenzenesulfonamide, thiourea, guanidine, 3,4-dimethylpyrazole phosphate, 2,4-diamino-6-trichloromethyl-5-triazine, polyetherionophores, 4-amino-1,2,4-triazole, 3-mercapto-1,2,4-triazole, potassium azide, carbon bisulfide, sodium trithiocarbonate, ammonium dithiocarbamate, 2,3, dihydro-2,2-dimethyl-7-benzofuranol methyl-carbamate, N-(2,6-dimethylphenyl)-N-(methoxyacetyl)alanine methyl ester, ammonium thiosulfate, 1-hydroxypyrazole, 2-methylpyrazole-1-carboxamide, derivatives thereof, and any combination thereof.

33. The fertilizer or method according to any one of paragraphs 1 to 32, wherein the nitrification inhibitor is dicyandiamide.

34. The fertilizer or method according to any one of paragraphs 1 to 33, wherein the ammonia source comprises one or more ammonium salts, aqueous ammonia, anhydrous ammonia, or any combination thereof.

35. The fertilizer or method according to any one of paragraphs 1 to 34, wherein the formaldehyde comprises an aqueous solution, and wherein the concentration of the formaldehyde in the aqueous solution ranges from about 10 wt % to about 50 wt %, based on a total weight of the aqueous solution.

36. The fertilizer or method according to any one of paragraphs 1 to 35, wherein the formaldehyde comprises an aqueous solution, and wherein a concentration of the formaldehyde in the aqueous solution ranges from about 37 wt % to about 50 wt %, based on a total weight of the aqueous solution.

37. The fertilizer or method according to any one of paragraphs 1 to 14 or 19 to 36, wherein a concentration of the reaction product in the fertilizer ranges from about 0.5 wt % to about 20 wt %, based on a total amount of nitrogen in the nitrogen source.

38. The fertilizer or method according to any one of paragraphs 1 to 14 or 19 to 37, wherein a concentration of the reaction product in the fertilizer ranges from about 1 wt % to about 15 wt %, based on a total amount of nitrogen in the nitrogen source.

39. The fertilizer or method according to any one of paragraphs 1 to 38, wherein the nitrogen source is a solid, a liquid, or a combination thereof.

40. The fertilizer or method according to any one of paragraphs 1, 3 to 18, or 20 to 39, wherein the reaction product further comprises a urease inhibitor reacted with the formaldehyde, ammonia source, and nitrification inhibitor.

41. The fertilizer or method according to paragraph 2 or 19, wherein the reaction product further comprises a urease inhibitor reacted with the formaldehyde, urea, ammonia source, and nitrification inhibitor.

42. The fertilizer or method according to any one of paragraphs 1 to 41, further comprising one or more urease inhibitors combined with the reaction product.

43. The fertilizer or method according to any one of paragraphs 40 to 4, wherein the urease inhibitor comprises N-(n-butyl)thiophosphoric triamide, N-(n-butyl)phosphoric triamide, thiophosphoryl triamide, phenyl phosphorodiamidate, cyclohexyl phosphoric triamide, cyclohexyl thiophosphoric triamide, phosphoric triamide, hydroquinone, pbenzoquinone, hexamidocyclotriphosphazene, thiopyridines, thiopyrimidines, thiopyridine-N-oxides, N,N-dihalo-2-imidazolidinone, N-halo-2-oxazolidinone, derivatives thereof, or any combination thereof.

44. The fertilizer or method according to any one of paragraphs 1 to 14 or 19 to 43, wherein the fertilizer is applied to a soil in an amount ranging from about 30 kg/ha to about 350 kg/ha.

45. The method according to any one of paragraphs 16 to 18, wherein the one or more nitrogen sources comprise urea, ammonia, ammonium nitrate, or any combination thereof.

46. The method according to any one of paragraphs 16 to 18 or 45, further comprising disposing one or more nitrogen sources on the soil, within the soil, or both, wherein the one or more nitrogen sources comprise animal manure, animal urine, or a combination thereof.

47. The method according to any one of paragraphs 16 to 18, 45, or 46, wherein the reaction product is applied to the soil after the one or more nitrogen sources.

48. The method according to any one of paragraphs 16 to 18 or 45 to 47, wherein the reaction product is applied to the soil before the one or more nitrogen sources.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited m this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing a fertilizer, comprising:
reacting formaldehyde, an ammonia source, urea, and a nitrification inhibitor to produce a reaction product comprising the formaldehyde, ammonia, urea, and nitrification inhibitor; and
combining the reaction product with one or more nitrogen sources to produce the fertilizer;
wherein the amount of the reaction product in the fertilizer ranges from about 0.5 wt % to about 20 wt %, based on the total amount of nitrogen in the one or more nitrogen sources in the fertilizer.

2. The method of claim 1, wherein the one or more nitrogen sources comprise urea, urea-formaldehyde polymers, anhydrous ammonia, aqueous ammonia, ammonium nitrate, or a combination thereof.

3. The method of claim 1, wherein the ammonia source is ammonium hydroxide, ammonium chloride, ammonium nitrate, anhydrous ammonia, aqueous ammonia, or a combination thereof.

4. The method of claim 1, wherein the nitrification inhibitor is 2-chloro-6-(trichloromethyl)-pyridine; 5-ethoxy-3-trichloromethyl-1,2,4-thiadiazol; dicyandiamide (DCD); 2-amino-4-chloro-6-methyl-pyrimidine; 1,3-benzothiazole-2-thiol; 4-amino-N-1,3-thiazol-2-ylbenzenesulfonamide; thiourea; guanidine; 3,4-dimethylpyrazophosphate; 2,4-diamino-6-trichloromethyl-5-triazine; polyetherionophores; 4-amino-1,2,4-triazole; 3-mercapto-1,2,4-triazole; potassium azide; carbon bisulfide; sodium trithiocarbonate; ammonium dithiocarbamate; 2,3, dihydro-2,2-dimethyl-7-benzofuranol methyl-carbamate; N-(2,6-dimethylphenyl)-N-(methoxyacetyl)-alanine methyl ester; ammonium thiosulfate; 1-hydroxypyrazole; 2-methylpyrazole-1-carboxamide; derivatives thereof, or any combination thereof.

5. The method of claim 1, wherein the nitrogen source is a solid.

6. The method of claim 1, wherein the nitrogen source is a liquid.

7. The method of claim 1, wherein the nitrogen source is a mixture of a solid nitrogen source and a liquid nitrogen source.

8. The method of claim 1, wherein the reaction product has a pH ranging from about 4 to about 6.

9. The method of claim 1, wherein the formaldehyde, the ammonia source, urea, and the nitrification inhibitor are reacted under alkaline reaction conditions to produce a reaction product having a pH ranging from about 8 to about 11.

10. The method of claim 1, wherein the formaldehyde, the ammonia source, urea, and the nitrification inhibitor are reacted in water under alkaline reaction conditions to produce an aqueous reaction product.

11. The method of claim 1, wherein reacting the formaldehyde, ammonia source, urea, and nitrification inhibitor comprises:
combining the formaldehyde and the nitrification inhibitor at a molar ratio of from about 1:1 to about 3:1 to produce a first mixture;
heating the first mixture to a temperature ranging from about 50° C. to about 80° C.;
adding the urea to the first mixture;
introducing an ammonia source to the first mixture to produce a second mixture, wherein the total amount of ammonia source introduced to the first mixture provides a formaldehyde to ammonia source molar ratio ranging from about 3:1 to about 9:1; and
heating the second mixture to a temperature ranging from about 70° C. to about 90° C.; and cooling the second mixture to produce the reaction product.

12. The method of claim 1, wherein a molar ratio of the formaldehyde to ammonia in the reaction product ranges from about 3:1 to about 9:1 and a molar ratio of the formaldehyde to nitrification inhibitor in the reaction product ranges from about 1:1 to about 3:1.

13. The method of claim 1, wherein the reaction product comprises:
from about 30 mol % to about 70 mol % formaldehyde;
from about 5 mol % to about 25 mol % ammonia source; and
from about 15 mol % to about 45 mol % nitrification inhibitor;
based on the total weight of the formaldehyde, the ammonia source, and the nitrification inhibitor.

14. The method of claim 1, wherein a molar ratio of the formaldehyde to the ammonia source in the reaction product ranges from about 1:1 to about 1:8 and a molar ratio of the formaldehyde to nitrification inhibitor in the reaction product ranges from about 1:1 to about 7:1.

15. The method of claim 1, wherein the formaldehyde comprises an aqueous solution, and wherein the concentration of the formaldehyde in the aqueous solution ranges from about 37% to about 50%.

16. The method of claim 1, wherein a concentration of the nitrification inhibitor in the fertilizer ranges from about 0.1 wt % to about 20 wt %, based on a total amount of nitrogen in the one or more nitrogen sources in the fertilizer.

17. The method of claim 1, wherein a concentration of the nitrification inhibitor in the fertilizer ranges from about 1 wt % to about 10 wt %, based on a total amount of nitrogen in the one or more nitrogen sources in the fertilizer.

18. The method of claim 1, further comprising one or more urease inhibitors, wherein the urease inhibitor is N-(n-butyl)thiophosphoric triamide, N-(butyl)phosphoric triamide, thiophosphoryl triamide, phenyl phophorodiamidate, cyclohexyl phosphoric triamide, cyclohexyl thiophosphoric triamide, phosphoric triamide, hydroquinone, p-benzoquinone, hexamidocyclotriphophazene, thiophyridines, thiophyrimidines, thiophyridine-N-oxides, N,N-dihalo-2-imidazolidinone, N-halo-2-oxazolidinone, derivatives thereof, or any combination thereof.

19. The method of claim 1, wherein the reaction product further comprises a urease inhibitor reacted with the formaldehyde, ammonia source, urea, and nitrification inhibitor.

20. The method of claim 1, wherein the fertilizer is further mixed with a fertilizer nutrient, pesticide, herbicide, fungicide, or combination thereof.

\* \* \* \* \*